United States Patent [19]

Schmoeger et al.

[11] Patent Number: 5,122,769
[45] Date of Patent: Jun. 16, 1992

[54] SYSTEM AND METHOD FOR REPRODUCING AN IMAGE

[75] Inventors: Mary L. Schmoeger; Charles P. Hagmaier, Jr., both of Rochester; Mitchell J. Bogdanowicz, Spencerport; Christopher L. DuMont; Richard C. Sehlin, both of Rochester, all of N.Y.

[73] Assignee: Eastman Kodak Company, Rochester, N.Y.

[21] Appl. No.: 718,685

[22] Filed: Jun. 21, 1991

[51] Int. Cl.$^5$ .................. G03B 27/32; G03B 27/52; G03B 27/72
[52] U.S. Cl. ........................... 355/32; 355/35; 355/77
[58] Field of Search ............ 355/32, 35, 88, 77

[56] References Cited

U.S. PATENT DOCUMENTS

| | | | |
|---|---|---|---|
| 3,085,468 | 4/1963 | Hehn | 355/32 |
| 4,359,280 | 11/1982 | Krause | 355/37 |
| 4,529,301 | 7/1985 | Rountree | 355/77 |
| 4,676,628 | 6/1987 | Asbury, III | 355/38 |
| 4,939,537 | 7/1990 | Masuda et al. | 355/35 |
| 4,975,737 | 12/1990 | Murooka et al. | 355/77 |
| 5,019,873 | 5/1991 | Imaeda | 355/35 X |
| 5,043,824 | 8/1991 | Suzuki | 355/35 X |

*Primary Examiner*—Richard A. Wintercorn
*Attorney, Agent, or Firm*—Joshua G. Levitt

[57] ABSTRACT

There is described a system and method for reproducing an original record using a narrow band filter, such as a dichroic filter, to modify the contrast of the reproduction without modifying the color balance or the wavelength peak of sub-records. The system is particularly useful in reproducing motion picture records using subtractive lamp houses so as to have their contrast and color reproduction match records generated using additive lamp houses.

11 Claims, 6 Drawing Sheets

SYSTEM AND METHOD FOR REPRODUCING AN IMAGE

TECHNICAL FIELD

This invention relates to a system and a method for reproducing an original record in a light sensitive material. In a particular aspect it relates to a system and a method in which the neutral and color contrasts of the copy are modified by the use of narrow band filters, but the color balance and peak wavelength absorption are not.

BACKGROUND OF THE INVENTION

In the motion picture industry, it is common practice to make prints of a duplicate motion picture negative. This is done for several reasons, the most significant being that the original negative is preserved as a master record. Thus, typically, the original negative is copied onto an intermediate negative film one or more times. That copy, in turn, is used to make positive prints which are projected in a movie theatre.

Copying of the original negative record to make an intermediate negative, or printing of an intermediate negative record to give a positive is accomplished by illuminating the record to be copied with a lamp so that radiation passing thru the record to be copied impinges on the light sensitive material in which the reproduction will be formed.

It is common practice to employ as the source of illumination three separate portions of the visible spectrum; one which has its peak in the blue region of the spectrum, between about 400 and 500 nm, one which has its peak in the green region of the visible spectrum between about 500 and 600 nm, and one which has its peak in the red region of the visible spectrum between about 600 and 700 nm. The exposing radiation could be provided by three separate light sources of the appropriate spectral distribution, or it could be provided by a single white light source which is split into three separate beams which are filtered with red, green or blue filters before they illuminate the record being copied. Typically each of the exposure sources, the dyes which provide the absorption in the record to be copied and the sensitivity of the light sensitive element onto which the copy is made are chosen so that their peaks approximately match.

The type of exposure source described above is referred to in the art as an additive lamp house. While it is the one which is commonly used in the motion picture industry for reproduction of negatives and preparation of prints, it is not the only one which is used. Also known are light sources which have a continuous emission across the visible region of the spectrum. These are commonly referred to as subtractive light sources or as subtractive lamp houses. When an original record to be copied is exposed to such a light source, it modulates the light differently than it does light from an additive light source and, as a result, the spectral wavelength distribution of the light reaching the light sensitive material and, consequently, the color reproduction in the copy are different. This can be a problem, especially when reproductions exposed with both types of light source are ultimately joined in a single print.

Heretofore the industry has used two separate types of reproduction material, one for additive light sources and one for subtractive light sources. This has associated with it all of the problems associated with multiple inventories.

We have found that selective filtration with narrow band filters modifies the light modulated by the record being copied and can result in a reproduction using an subtractive light source that is compatible with a reproduction made using an additive light source.

While narrow band filters have been used previously to modify reproductions, they have been used in different ways and for different purposes than they are used in accordance with the present invention.

Hehn U.S. Pat. No. 3,085,468, issued Apr. 16, 1963 describes the use of dichroic filters in printing photographic originals in place of the red, green and blue filters commonly used in additive printing systems.

Krause U.S. Pat. No. 4,359,280, issued Nov. 16, 1982 describes the use of dichroic filters, and other narrow band filters to modify contrast by shifting peak intensity characteristics of the light modulated by the record being copied. This is different from the present invention in which the peak intensities are not changed.

STATEMENT OF THE INVENTION

In accordance with one aspect of this invention, there is provided a system for reproducing an original color record on a light sensitive material, the system comprising:
a) a color record having two or more sub-records with wavelength peaks in different regions of the electromagnetic spectrum;
b) a continuous wavelength light source;
c) a light sensitive material onto which the color record can be illuminated by means of the light source; and
d) selective filtration means between the light source and the light sensitive material;
wherein the selective filtration means modifies the contrast of the reproduction by means of off-peak energy filtration, without modifying the color balance of the reproduction or the wavelength peak of each of the sub-records.

In another aspect, this invention relates to a process for reproducing a color image, comprising the steps of:
a) providing a continuous wavelength light source,
b) providing a color record having sub-records with wavelength peaks in at least two different regions of the electromagnetic spectrum;
c) providing a light sensitive material onto which the color record can be illuminated;
d) illuminating the color record onto the light sensitive material with the continuous wavelength light source;
e) selectively filtering from the continuous wavelength light source one or more narrow bands of off-peak energy to modify the contrast of the reproduction without modifying the color balance of the reproduction or the wavelength peak energy of each of the sub-records. In preferred embodiments of this invention: the color record is comprised of cyan, magenta and yellow sub-records; the light sensitive material is sensitized to the red, green and blue regions of the spectrum and the filtration means is a dichroic filter.

BRIEF DESCRIPTION OF THE DRAWINGS

FIGS. 6 and 7 are plots of contrast (density vs. log exposure) for a typical print film exposed to a step image with the lamphouses filtered as in FIGS. 2 and 4. FIG. 6 shows red contrast of a neutral exposure and FIG. 7 shows red contrast of a red exposure. The latter is a measure of color reproduction.

DETAILED DESCRIPTION

Figure 1:
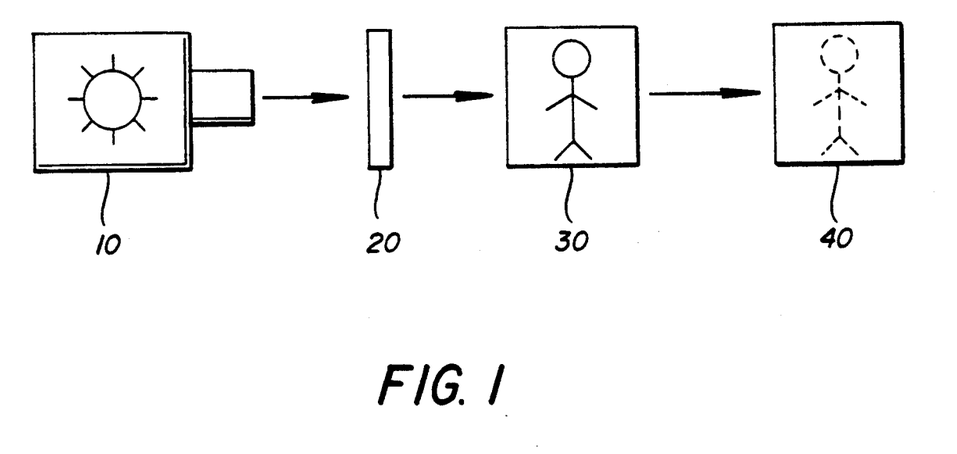
FIG. 1 is a schematic illustration of a system for reproducing an original record, in accordance with this invention.

FIG. 1 shows a system for copying, or printing, an original record onto a light sensitive material in accordance with this invention. There is shown a subtractive lamphouse, 10, a narrow band filter, 20, an original record to be copied, and a light sensitive material, 40, in which the original record will be reproduced.

As discussed above, the subtractive lamphouse used in the system of this invention comprises a continuous wavelength light source which is capable of illuminating the original record and causing the pattern of radiation thus generated to impinge on the light sensitive material in which the reproduction will be produced. The lamphouse also typically has a lens and means for adjusting the intensity of the output. Typical subtractive lamphouses are Acme lamphouses available from Photo-Sonics, Inc., S. Mariposa Street, Burbank, Calif. 91506. Typical additive lamphouses are Bell & Howell lamphouses available from BHP Inc., 1800 Winnemac Ave., Chicago, Ill. 60670.

The light source in the lamphouse is a continuous wavelength light source. For copying a full color original onto a material sensitized to the visible region of the spectrum, the light source is typically and preferably a white light source. Such a light source would have an energy distribution in the visible region of the electromagnetic spectrum, from about 400 nm to about 700 nm. However, if the original record has a significant component of the image to be copied outside the visible region of the spectrum, and/or the light sensitive material is sensitized to a region of the spectrum outside the visible, the light source should have an energy output in corresponding regions of the electromagnetic spectrum.

Figure 2:
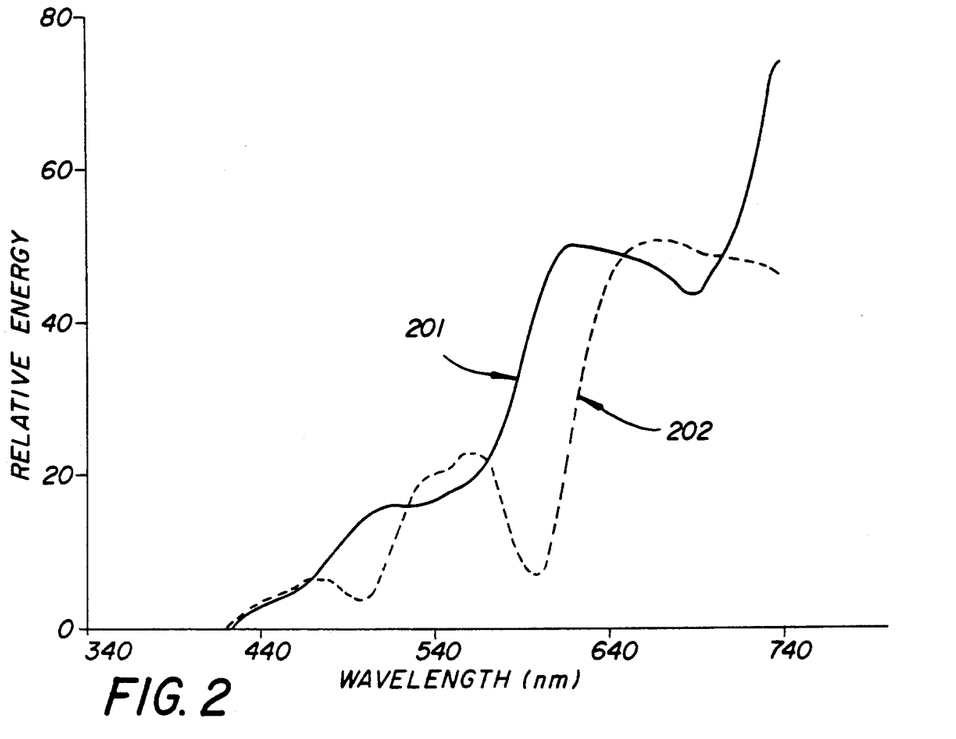
FIG. 2 is a plot of relative energy distribution vs. wavelength for a typical subtractive lamphouse and a typical additive lamphouse.

Curve 201 in FIG. 2, shows relative energy vs. wavelength for a typical subtractive lamphouse. When compared with a similar curve for an additive lamphouse, Curve 202, it will be observed that the subtractive lamphouse produces more energy in the regions of the spectrum from about 470 nm to about 510 nm and from about 570 nm to about 620 nm. This additional energy results in a difference in color reproduction and contrast if the same light sensitive material is used. This will be observed from FIGS. 6 and 7, in which the contrast of the images which were generated using a subtractive lamphouse, curves 601 and 701 is less than the contrast of the images generated using an additive lamphouse, curves 702 and 703.

In accordance with the invention, this difference in wavelength distribution of the energy output of the subtractive lamp house is compensated for by a narrow band filter. Such a filter would remove from the energy output of the lamphouse one or more narrow wavelength bands of radiation. Suitable filters include dichroic filters and dye filters.

Dichroic filters transmit selected wavelengths of light and reflect the remaining wavelengths. There construction is described in Henn U.S. Pat. No. 3,085,468, issued Apr. 16, 1963 and in Pearson U.S. Pat. No. 4,355,888, issued Oct. 26, 1982. Typically, they comprise alternating layers of materials of different refractive indices. In the case of dichroic filters selected for use in the present invention, the filter would reflect the desired narrow band, or bands, of radiation and would transmit the remainder of the radiation.

Dye filters absorb selected wavelengths of light and transmit the remainder. While many dye filters used elsewhere in photography have an absorption profile that is too broad for use in this invention, there are some that are useful. These include the squarillium dye filters described in Haley et al. U.S. Pat. Nos. 4,175,956 issued Nov. 27, 1979; Haley et al. U.S. Pat. Nos. 4,743,528, 4,743,529, 4,743,530, and 4,743,531 all issued on May 10, 1988. In the case of dye filters selected for use in the present invention, the filter would absorb the desired narrow band, or bands, of radiation and transmit the rest.

Whether the narrow band filter is a dye filter or a dichroic filter, it is selected so as to remove from the output of the lamphouse one or more narrow wavelength bands of radiation. The band is selected so as to cause the output of the subtractive lamphouse to be similar to that of an additive lamphouse. The band should be no broader than is needed to accomplish this. Typically a band of radiation in the range of 20 nm to 80 nm in width are adequate for this purpose, with about 40 nm being optimum for the specific materials with which the present invention is preferably used. If the band of radiation which is filtered out is too wide, not only may it have an adverse effect on color reproduction, but it unnecessarily filters light that can be used for exposure of the light sensitive material and thus requires an increased amount of energy for exposure.

It will be appreciated that the particular band of radiation and its width can be determined by a comparison of the spectral energy curves of the lamphouses and their effect on the contrast of the print material. The number of bands of radiation that should be filtered and their width can be determined empirically. While in some instances filtration of a single band will be adequate, in others two or more bands should be filtered for best results.

The filter is selected so that it does not filter at the wavelength peaks of the image sub-records. If filtration were on peak, it would modify the color balance of the reproduction, which is undesirable in a system which already is in balance.

Figure 3:
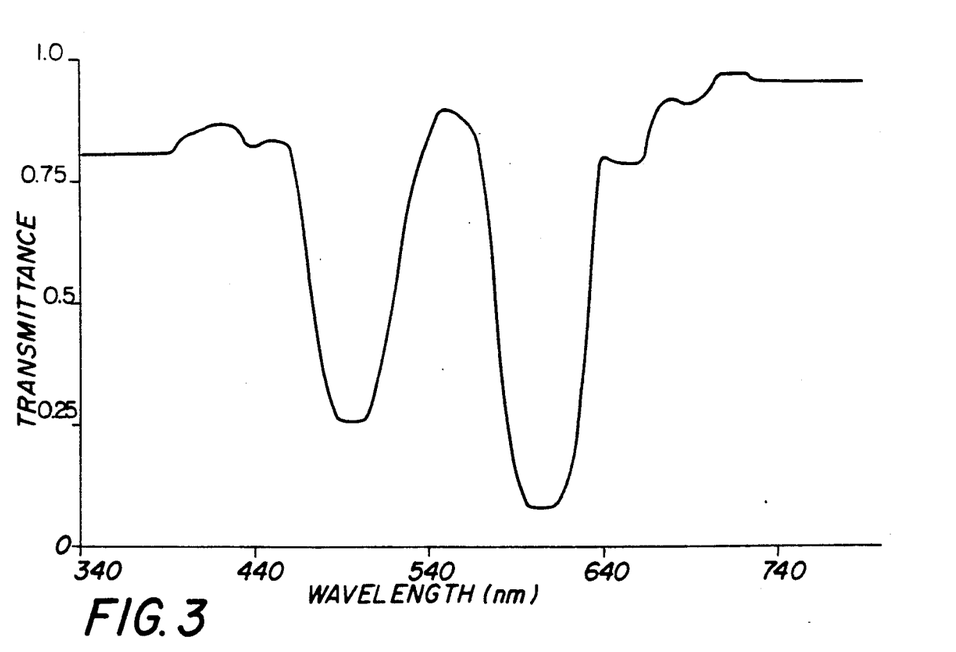
FIG. 3 is a plot of transmittance vs. wavelength for a pair of dichroic filters useful in this invention.
Figure 4:
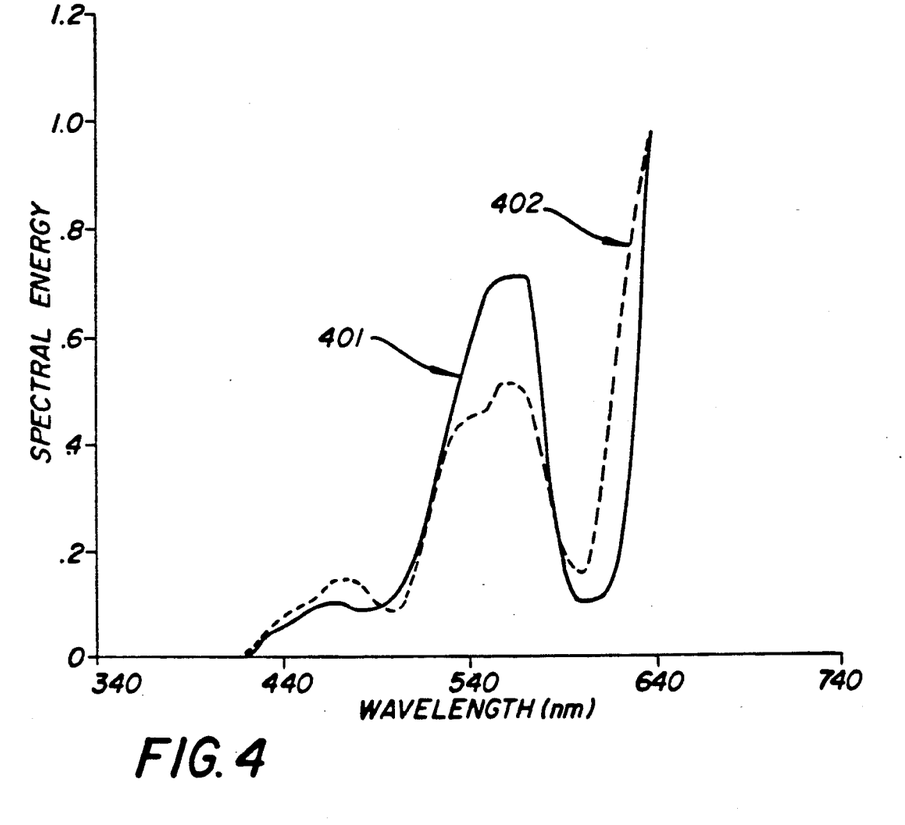
FIG. 4 is a plot of relative energy distribution vs. wavelength for a typical additive lamphouse and a subtractive lamphouse filtered in accordance with this invention.

FIG. 3 illustrates a dichroic filter useful in this invention that filters out two narrow band of radiation centered on about 495 nm and 605 nm. This filter is optimized for use with the subtractive lamphouse whose output is illustrated by curve 201 in FIG. 2. The effect of interposing this filter between the subtractive lamphouse of FIG. 2 and the original record is illustrated in FIG. 4. It is observed that Curve 401, which represents the combination of the subtractive lamphouse and the dichroic filter of FIG. 3, closely matches Curve 402, which is the same as Curve 202 of FIG. 2. Thus, filtration in accordance with this invention results in the presentation to the original record of a wavelength distribution from a subtractive lamphouse that is almost the same as the wavelength distribution from an additive lamphouse.

In a preferred embodiment, the filter is positioned between the lamphouse and the original to be reproduced, as shown in FIG. 1. However, it is within the scope of this invention to position the filter so as to filter radiation after it passes through the original record, so long as it is filtered before it reaches the light sensitive material.

Figure 5:
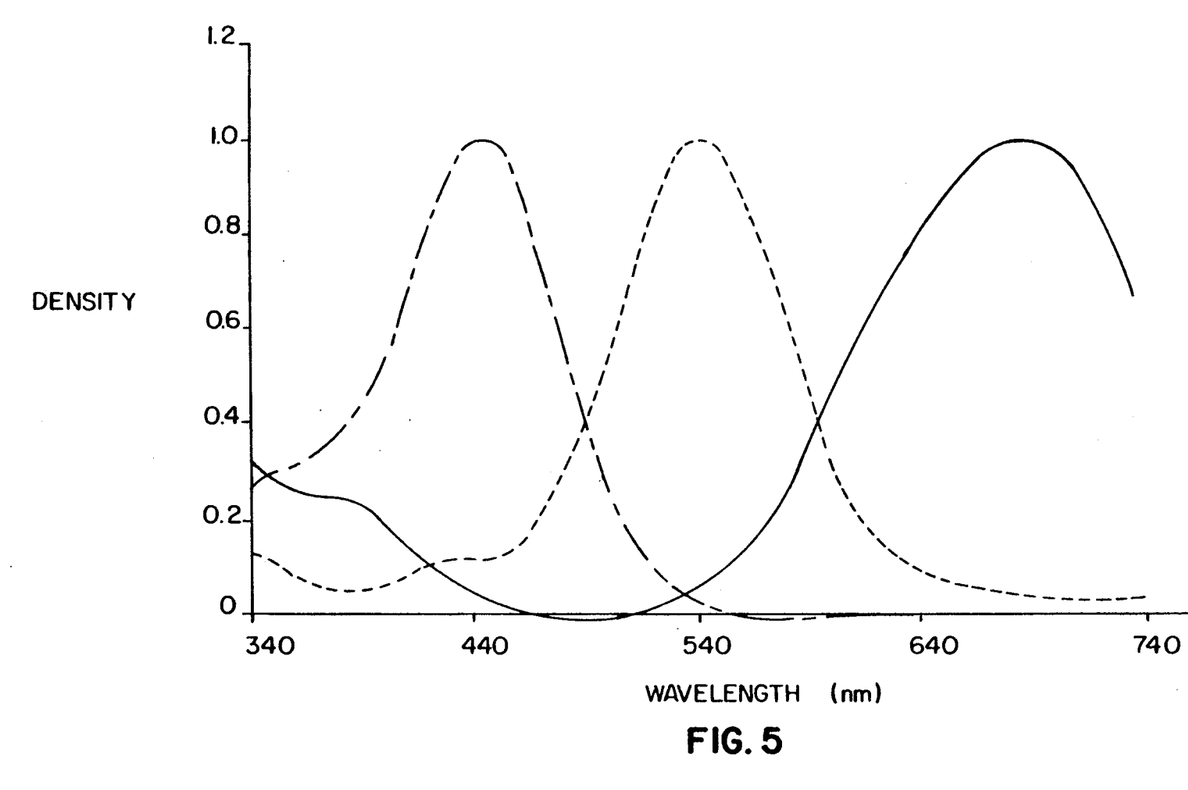
FIG. 5 is a plot of spectral absorption for the cyan, magenta and yellow sub-records in a typical color record reproduced in accordance with this invention.

The original record to be reproduced can be any image composed of sub-records having radiation patterns in different regions of the spectrum. Typically it will be a multicolor record composed of sub-records formed from cyan, magenta and yellow dyes. The principle by which such materials form a color image are described in James, The Theory of the Photographic Process, Chapter 12, Principles and Chemistry of Color Photography, pp 335-372, 1977, Macmillan Publishing Co. New York, and suitable materials useful to form original records are described in Research Disclosures, December, 1987, Item 17643, published by Industrial Opportunities Ltd., Homewell Havant, Hampshire, PO9 1EF, United Kingdom. Materials in which such images are formed can be exposed to an original scene in a camera, or can be duplicates formed from such camera origination materials. The preferred materials, with which the present invention is contemplated being used, are original records formed in color negative intermediate films such as those identified by the tradenames Eastman Color Intermediate Films 2244, 5243, 5244, 7243, and 7244. The spectral absorption curve for the image in such an original record is shown in FIG. 5. It will be observed that it has peak absorptions in the blue region of the spectrum at about 440 nm, in the green region of the spectrum at about 540 nm, and in the red region of the spectrum at about 680 nm. It also will be observed that these peaks correspond approximately to the output peaks of the additive lamphouse. For optimum effect in the present invention, the narrow bands of radiation filtered in accordance with this invention should be between these radiation peaks.

The light sensitive material on to which the original record is illuminated, and in which the copy is reproduced, preferably is a light sensitive material of the type described above in connection with the original record. It can comprise a support bearing light sensitive layers sensitized to two or more regions of the electromagnetic spectrum. Typically, it is a light sensitive silver halide material containing units sensitive to each of the red, green and blue regions of the visible spectrum. Such materials are described in the Research Disclosure publication cited above. It is within the scope of this invention for the light sensitive material to be comprised of another known light sensitive material and/or for the material to be sensitive to one or more regions of the electromagnetic spectrum outside the visible, such as the infra red region of the spectrum. Preferred light sensitive materials include the color intermediate films identified above as well as print films identified by such tradenames as Eastman Color Print Film 5380 and 5384. Once these materials are exposed in accordance with this invention, they are conventionally processed to form a visible image in the material.

Figure 6:
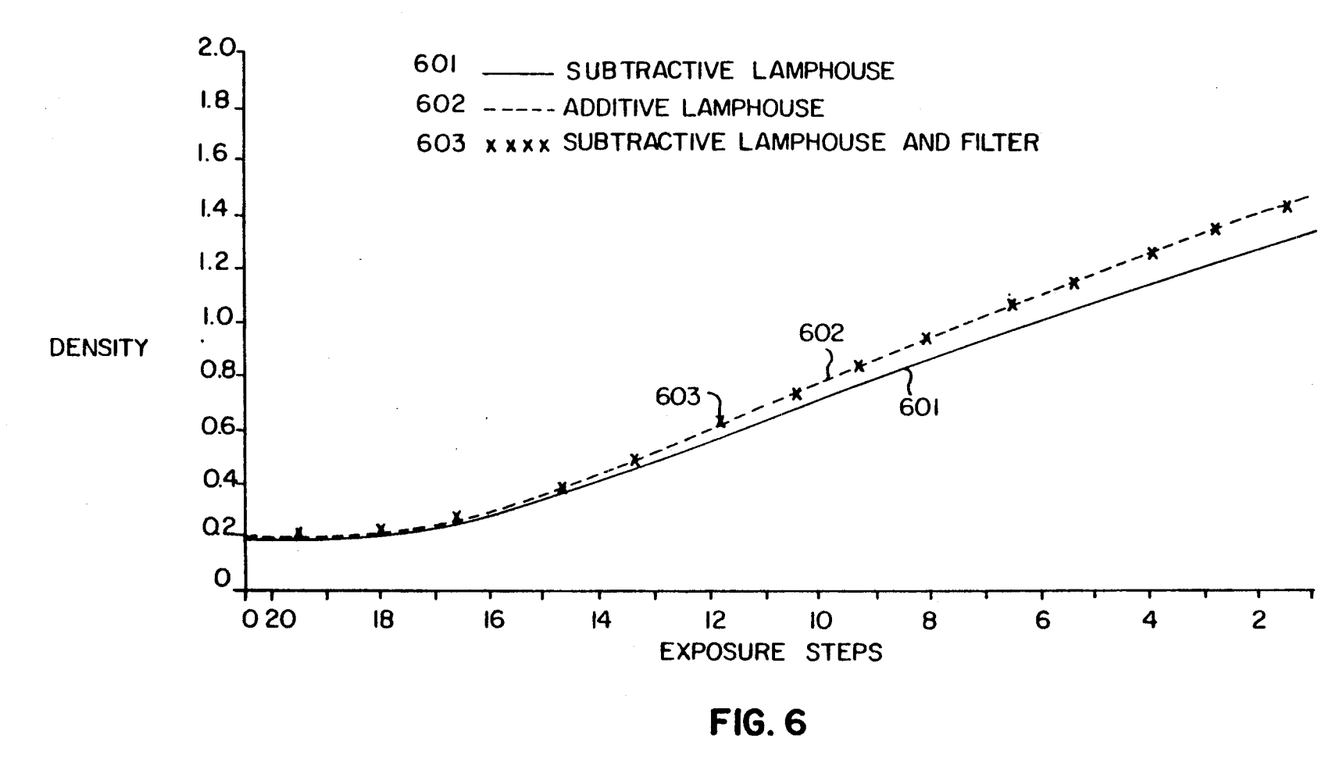
Figure 7:
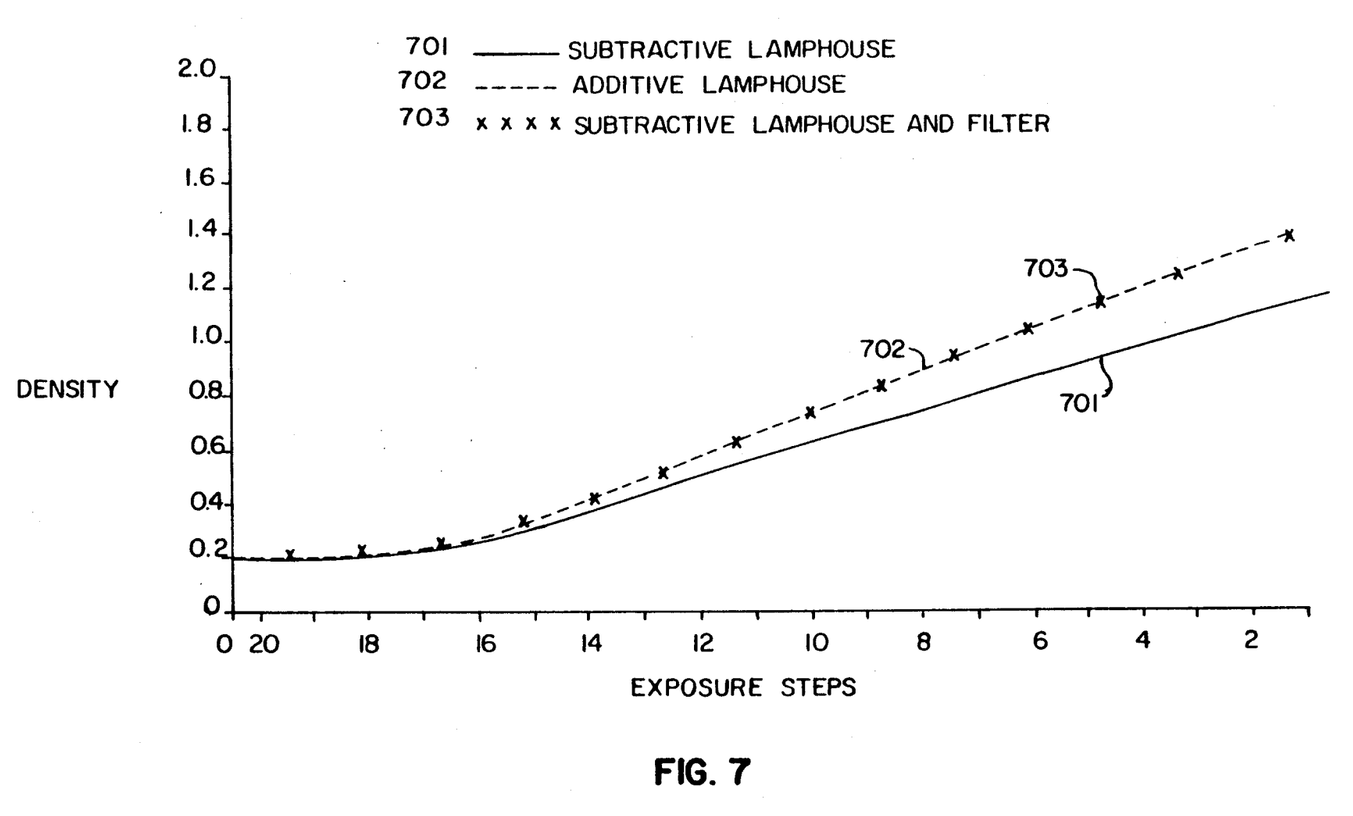

The effect of this invention is illustrated in the contrast curves of the red sub-record of an image reproduced in accordance with this invention, as shown in FIGS. 6 and 7. In FIG. 6, Curve 601 illustrates the contrast of the image in a typical print material when exposed through an original to radiation from the subtractive lamphouse which has the distribution shown in curve 201 of FIG. 2; Curve 602 illustrates the contrast in the same print material when exposed to radiation from an additive lamphouse which has the distribution shown in Curve 202 of FIG. 2 or Curve 402 of FIG. 4; and Curve 603 illustrates the contrast in the same print material when exposed to radiation from the subtractive lamphouse that has been filtered in accordance with this invention and has the wavelength distribution shown in Curve 401 of FIG. 4. It is observed that while the contrast of Curve 601 is significantly less than that of Curve 602, the contrast of Curve 603 is almost the same. This illustrates the ability of this invention to correct for differences in the contrast of the printed image by selective narrow band filtration.

FIG. 7 is similar to FIG. 6, but represents the contrasts of the red records, excluding interactions of the blue and green records, resulting from exposures through a red step wedge with the lamphouses depicted in FIGS. 2 and 4. Low red separation contrast adversely affects color reproduction. It will be observed that while there is a significant difference in contrast between Curves 701 and 702, the contrast shown by Curves 702 and 703 is the same. This illustrates the ability of the invention to correct for differences in red color reproduction. Similar effects are obtained in the blue and green records.

This invention has been described in detail with particular reference to preferred embodiments thereof. It will be understood that variations and modifications can be made within the spirit and scope of the invention.

What is claimed is:

1. A system for reproducing an original color record on a light sensitive material, the system comprising:
    a) a color record having two or more sub-records with wavelength peaks in different regions of the electromagnetic spectrum;
    b) a continuous wavelength light source;
    c) a light sensitive material onto which the color record can be illuminated by means of the light source; and
    d) selective filtration means between the light source and the light sensitive material;

wherein the selective filtration means modifies the contrast of the reproduction by means of off-peak energy filtration, without modifying color balance of the reproduction or the wavelength peaks of each of the sub-records.

2. A system of claim 1, wherein:
    a) the color record has cyan, magenta and yellow sub-records; and
    b) the selective filtration means modifies the contrast of the reproduction by means of off-peak energy filtration, without modifying peak energy of each of the cyan, magenta and yellow sub-records.

3. A system of claim 2 wherein:
    a) the color record is a color negative;
    b) the illumination means is a subtractive lamp house;
    c) the light sensitive material is a silver halide element sensitive to each of the red, green and blue regions of the visible spectrum; and
    d) the filtration means is a narrow band filter.

4. A system of claim 1, wherein the filter is a dichroic filter.

5. A system of claim 4, wherein the filter reflects one or more discrete narrow bands having a bandwidth of between 20 nm and 80 nm.

6. A system of claim 3, wherein the filter is a dichroic filter which reflects two narrow bands having a bandwidth of 20 nm to 40 nm.

7. A system of claim 6, wherein the bands are centered on about 495 nm and 605 nm, respectively.

8. A method for reproducing a color image, comprising the steps of:
   a) providing a continuous wavelength light source,
   b) providing a color record having two or more sub-records with wavelength peaks in different regions of the electromagnetic spectrum;
   c) providing a light sensitive material onto which the color record can be illuminated;
   d) illuminating the color record onto the light sensitive material with the continuous wavelength light source;
   e) selectively filtering from the continuous wavelength light source one or more narrow bands of off-peak energy to modify the contrast of the reproduction without modifying the color balance of the reproduction or the wavelength peak of each of the sub-records.

9. A method of claim 8, wherein:
   a) the color record has cyan, magenta and yellow sub-records;
   b) the light sensitive material is a silver halide element having layers sensitive to each of the red, green and blue regions of the visible spectrum. and
   c) the selective filtration means is a narrow band dichroic filter positioned between the light source and the light sensitive material which modifies the contrast of the reproduction by means of off-peak energy filtration, without modifying the color balance of the reproduction or the peak energy of each of the cyan, magenta and yellow sub-records.

10. A method of claim 9, wherein the filter reflects one or more discrete narrow bands having a bandwidth of between 20 nm and 80 nm.

11. A method of claim 10 wherein the filter reflects two discrete narrow bands centered on about 495 nm and 605 nm, respectively.

* * * * *